3,121,748
LONG CHAIN NITRAMINE DIOLS
William A. Gey, China Lake, and Russell Reed, Jr., Santa Monica, Calif., assignors to the United States of America as represented by the Secretary of the Navy
No Drawing. Filed June 23, 1959, Ser. No. 822,394
9 Claims. (Cl. 260—584)
(Granted under Title 35, U.S. Code (1952), sec. 266)

The invention herein described may be manufactured and used by or for the Government of the United States of America for governmental purposes without the payment of any royalties thereon or therefor.

This invention relates to new chemical compounds, specifically, long chain nitramine diols having more than two nitramino groups in the chain. It further relates to the method of preparing these compounds and to polymers of the compounds with diisocyanates and difunctional acids.

The nitramine diols of the invention are as follows: 3,11-dioxa-5,7,9-trinitro-5,7,9 - triaza - 1,13 - tridecanediol (I), 3,13-dioxa-5,7,9,11-tetranitro-5,7,9,11-tetraaza - 1,15-pentadecanediol (II), 3,11,14,22-tetraoxa-5,7,9,16,18,20-hexanitro-5,7,9,16,18,20 - hexaaza - 1,24 - tetracosanediol (III), and 3,11,14,22,25,33-hexaoxa-5,7,9,16,18,20,27,29, 31-nonanitro-5,7,9,16,18,20,27,29,31-nonaaza-1,35 -pentatricontanediol (IV).

The structural formulas of these compounds are as follows:

$$HOCH_2CH_2O[CH_2N(NO_2)]_3CH_2OCH_2CH_2OH$$
I $$HOCH_2CH_2O[CH_2N(NO_2)]_4CH_2OCH_2CH_2OH$$
II $$HOCH_2CH_2O[CH_2N(NO_2)]_3CH_2OCH_2CH_2O$$
$$[CH_2N(NO_2)]_3CH_2OCH_2CH_2OH$$
III $$HOCH_2CH_2O[CH_2N(NO_2)]_3CH_2OCH_2CH_2O$$
$$[CH_2N(NO_2)]_3CH_2OCH_2CH_2O-$$
$$[(CH_2N(NO_2)]_3CH_2OCH_2CH_2OH$$
IV

The compounds will be referred to hereinafter by the numbers as indicated above.

The nitramine diols are prepared by treating linear nitramines having terminal nitroxy or halogen groups with dihydric alcohols with or without calcium carbonate, as set forth in the following examples, which are illustrative of the invention but not limiting thereof.

Example I

A mixture of 21.6 g. of 1,7-dinitroxy-2,4,6-trinitro-2,4, 6-triazaheptane and 150 ml. of ethylene glycol was heated with stirring to 60° C. until the solid dissolved, when 150 ml. of isopropanol was added and the solution cooled to −5° C. overnight. Then 45 ml. of ethyl ether was added, the suspension was filtered and the filter cake washed with ether. The crude product was recrystallized from isopropanol to give 8 g. of product melting at 92–93° C. Analysis of a further purified sample melting at 94–95° C. was: C, 24.59%; H, 4.23%; N, 28.5%; calculated analysis for $C_8H_{18}N_3O_{10}$: C, 24.30%; H, 4.06%; N, 28.35%.

The equation for the above reaction is as follows:

$$O_2NO[CH_2N(NO_2)]_3CH_2ONO_2 \xrightarrow{HOCH_2CH_2OH} HOCH_2CH_2O[CH_2N(NO_2)]_3CH_2OCH_2CH_2OH$$

The method can be used to prepare both compounds I and III. The compounds are separated by the recrystallization step. The reaction was carried out with the addition of about 20.0 g. (0.200 mole) of calcium carbonate and the ethylene glycol removed under reduced pressure. Compound I was obtained in higher yield and purity. This modified process resulted in more effective isolation of compound III.

Example II

Compound III was prepared according to the following example:

A mixture of 39.0 g. (0.184 mole) of crude dry 1,7-dinitroxy-2,4,6-trinitro-2,4,6-triazaheptane (M.P. 148–150° C.) and 220 g. (3.50 moles) of ethylene glycol was heated on a steam bath for six hours. The colorless clear solution was cooled overnight at 5° C. The viscous, somewhat gelatinous mass that was produced was diluted with 300 ml. of cold water to aid in filtration. The gummy mass could not be sucked dry on the Büchner funnel and was dissolved in 100 ml. of an acetone solution to which 200 ml. absolute ethanol was added. There was obtained 3.8 g. (5.4%) of clean, colorless crystals, M.P. 121–124° C. The material was recrystallized by dissolving it in 15 ml. of acetone and adding 25 ml. of absolute ethanol. There resulted 2.5 g. of crystals (M.P. 127.5–128.0° C.) that was insoluble in cold alcohol but slightly soluble in boiling alcohol.

*Analysis.*—Calculated for $C_{14}H_{30}O_{18}N_{12}$: C, 25.69; H, 4.62; N, 25.68. Found: C, 25.33; H, 4.46; N, 25.91.

The equation illustrating the above reaction is given under Example I.

Example III

Compound II was prepared as follows: A suspension of 14.0 g. of 1,9-dinitroxy-2,4,6,8-tetranitro-2,4,6,8-tetrazanonane in 150 ml. of ethylene glycol was heated with stirring at 100° C. for four hours, cooled, and 150 ml. of methanol added. After cooling to 5° C., the precipitate was removed by filtering and washed with methanol and ether. The precipitate was dissolved in 200 ml. of methylethylketone, 200 ml. of methanol added, and the solution cooled to 5° C. On filtration and drying 12 g. of compound II, M.P. 178° C. was obtained. Analysis and other data proved that the product was compound II.

The above reaction is illustrated by the following equation.

$$O_2NO[CH_2N(NO_2)]_4CH_2ONO_2 \xrightarrow{HOCH_2CH_2OH} HOCH_2CH_2O[CH_2N(NO_2)]_4CH_2OCH_2CH_2OH$$
II

Example IV

Compound I was prepared by the following alternate method using 1,7-dichloro-2,4,6-trinitro-2,4,6-triazaheptane and ethylene glycol as starting materials.

A mixture of 30.7 g. (0.100 mole) of 1,7-dichloro-2,4, 6-trinitro-2,4,6-triazaheptane, 150 ml. of dioxane (freshly distilled from sodium), 20.0 g. (0.200 mole) of calcium carbonate, and 500 ml. of ethylene glycol (fractionated, anhydrous) was heated at 80° C. with stirring for 16 hours. The hot solution was filtered and the calcium salts washed with 100 ml. of acetone which was added to the filtrate. The filtrate was evaporated at 50° C. and 0.5 mm. until a solid residue was obtained, 36.9 g. The residue was treated with 200 ml. of boiling methanol and the solution filtered. Upon cooling the filtrate there was deposited 34.4 g. (96% yield) of compound I, M.P. 92.5–93.5° C. Recrystallization raised the melting point to 93.3–94° C. and produced 28.6 g. (80% yield). The melting point and mixture melting point with I prepared in Example I indicated that the product is the same as that produced in Example I.

The above reaction is illustrated by the following formula:

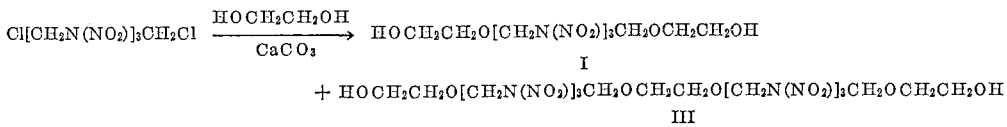

It will be noted that the separation of the two compounds is based on the solubility of compound I in boiling methanol. Compound III is insoluble in this reagent.

*Example V*

Compound III was prepared as follows: A mixture of 30.7 g. (0.100 mole) of 1,7-dichloro-2,4,6-trinitro-2,4,6-triazaheptane, 150 ml. of dioxane (freshly distilled from sodium), 20.0 g. (0.200 mole) of calcium carbonate and 37.2 g. (0.600 mole) of ethylene glycol (fractionated, anhydrous) was heated at 80° C. with stirring for 16 hours. The hot solution was filtered and the calcium salts washed with 100 ml. of acetone which was added to the filtrate. The filtrate was evaporated at 50° C. and 0.5 mm. until a solid residue was obtained, 37.8 g. The residue was treated with 150 ml. of boiling methanol for 10 minutes. The hot solution was filtered producing 24.3 g. of insoluble crude product. The product was recrystallized from 250 ml. of 1:1 acetone-methanol to yield 19.6 g. (60% yield) of the product, M.P. 127.5–128.2° C. Recrystallization raised the melting point to 128.0–128.7° C. The melting point and mixture melting point with the product produced in Example II sufficiently identifies it as the product produced in Example II.

The equation illustrating the above reaction was given under Example IV.

*Example VI*

Compound IV was prepared as follows: 28 g. of 1,7-dinitroxy-2,4,6-trinitro-2,4,6-triazaheptane was added to 175 ml. of ethylene glycol and the mixture was stirred at 60° C. for ½ hour, cooled and 150 ml. of isopropyl alcohol added. After standing 48 hours at 0° C. the precipitate was filtered off, washed with cold isopropyl alcohol and dried. Upon recrystallization from absolute alcohol, 1.0 g. of a colorless crystalline solid (M.P. 134–140° C.) precipitated during filtration. Recrystallization from a mixture of 3 ml. of acetone and 5 ml. of absolute alcohol produced 0.50 g., M.P. 142–144° C. Further recrystallization gave 0.30 g., M.P. 143–144° C.

*Analysis.*—Calculated for $C_{20}H_{42}O_{26}N_{18}$: C, 25.26; H, 4.45; N, 26.52. Found: C, 25.20; H, 4.31; N, 26.42.

The equation for the preparation of this compound is analogous to that for the preparation of compound III given under Example I.

The nitramine diols of the invention can be condensed with diisocyanates or difunctional acids to yield stable polymers which are useful as fuels, binders for solid rocket propellants, and desensitizing agents for high explosives. The polymers are compatible with single and double-base propellent formulations.

The following examples of the preparation of polymers using diisocyanates and two typical nitramine diols, compounds I and III, typify the preparation of like polymers with all members of the group.

*Example VII*

A solution of 3.5827 g. (0.01000 mole) of compound I and 3.3636 g. (0.010000 mole) for fractionated hexamethylene diisocyanate in 50 ml. of dioxane was heated at 90° C. for 24 hours. The precipitated polymer was filtered and washed with acetone, to yield 5.00 g. (95% yield) of amorphous, white solid, M.P. 160–260° C. dec. The polymer was insoluble in dioxane and acetone but very slightly soluble in dimethylformamide and slightly soluble in ethylene carbonate.

*Analysis.*—C, 36.51; H, 5.98; N, 21.21.

When the above polymerization was conducted at room temperature for two weeks there was obtained a 93% yield of polymer, M.P. 280° C. dec., insoluble in all hot organic solvents.

*Analysis.*—C, 36.29; H, 5.71; N, 21.44.

*Example VIII*

A solution of 3.5827 g. (0.010000 mole) of compound I and 2.0016 g. (0.010000 mole) of 3-nitraza-1,5-pentane diisocyanate and 50 ml. of dioxane was heated at 90° C. for 24 hours. The precipitated polymer was filtered and washed with acetone, to yield 7.01 g. (91% yield) of amorphous white solid, M.P. 205° C. dec. The polymer was insoluble in ordinary solvents but slightly soluble in hot dimethylformamide.

*Analysis.*—C, 29.95; H, 4.80; N, 25.22.

3-nitraza-1,5-pentane diisocyanate is prepared according to the following equations:

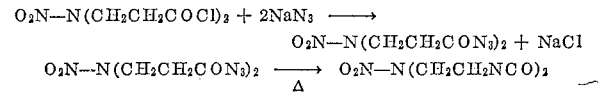

*Example IX*

A solution of 6.54489 g. (0.010000 mole) of compound III and 0.010000 mole of hexamethylene diisocyanate in 50 ml. of dioxane was heated 40 hours at 90° C. The precipitated polymer was filtered and washed with acetone, to yield 8.95 g. (94% yield), M.P. 220° C. dec. The polymer was insoluble in all ordinary hot solvents.

*Analysis.*—C, 32.11; H, 5.09; N, 23.75.

The utility of the nitramine diol-diisocyanate polymers is illustrated by the following solid rocket fuel composition incorporating a typical polymer, the polymer of Example VII.

| Ingredient: | Wt. percent |
|---|---|
| Polymer | 31 |
| NH$_4$ClO$_4$ | 68.5 |
| Carbon black | .5 |

The composition is compounded by conventional procedures well known in the art.

While the invention has been illustrated with specific reagents, these are illustrative only as equivalents therefor may be used.

Other halogen-substituted nitramines than the chlorosubstituted nitramines may be used as starting materials. For example, 1,7 - dibromo-2,4,6-trinitro-2,4,6-triazaheptane and 1,9-dibromo-2,4,6,8-tetranitro-2,4,6,8-tetraazanonane are effective starting materials.

Other dihydric compounds which may be substituted for ethylene glycol are trimethylene glycol, diethylene glycol, and/or their higher homologs.

Calcium carbonate may be replaced with the other alkaline earth carbonates, such as, the carbonates of barium and zinc.

The diisocyanates as a group form useful polymers with the nitramine diols. Other diisocyanates than those previously disclosed which may be used are toluene diisocyanate, alkyl diisocyanates such as, methylene diisocyanate, diphenylmethane-4,4'-diisocyanate, phenylene diisocyanate, 1-chloro-2,4-phenylene diisocyanate, 3,3'-dimethyl-4,4' - biphenylene diisocyanate, 3,3' - dimethyl - 4,4' - biphenylene diisocyanate, 3,3 - dinitro-1,5-pentane diisocyanate and other high energy diisocyanates containing either the nitraza or the gem-dinitro group.

Difunctional acids with which the nitramine diols of the invention may be polymerized are terephthalic, adipic, sebacic and other dicarboxylic acids.

Obviously many modifications and variations of the present invention are possible in the light of the above teachings. It is therefore to be understood that within the scope of the appended claims the invention may be practiced otherwise than as specifically described.

What is claimed is:

1. Compounds selected from the class consisting of 3, 11 - dioxa-5,7,9-trinitro-5,7,9-triaza-1,13-tridecanediol, 3, 13-dioxa - 5,7,9,11-tetranitro-5,7,9,11-tetraaza-1,15-pentadecanediol, 3,11,14,22 - tetraoxa - 5,7,9,16,18,20 - hexanitro - 5,7,9,16,18,20-hexaaza-1,24-tetracosanediol, and 3, 11,14,22,25,33 - hexaoxa - 5,7,9,16,18,20,27,29,31 - nonanitro - 5,7,9,16,18,20,27,29,31 - nonaaza,1,35 - pentatricontanediol.

2. 3,11 - dioxa-5,7,9-trinitro-5,7,9-triaza-1,13-tridecanediol.

3. 3,13 - dioxa - 5,7,9,11-tetranitro-5,7,9,11-tetraaza-1, 15-pentadecanediol.

4. 3,11,14,22 - tetraoxa-5,7,9,16,18,20-hexanitro-5,7,9, 16,18,20-hexaaza-1,24-tetracosanediol.

5. 3,11,14,22,25,33 - hexaoxa - 5,7,9,16,18,20,27,29,31-nonanitro - 5,7,9,16,18,20,27,29,31-nonaaza-1,35-pentatricontanediol.

6. The process for making nitramine diols having more than two nitramine groups in the chain which comprises heating a material having the formula $$R[CH_2N(NO_2)]_xCH_2R$$

wherein R is chosen from the group consisting of halogen and a nitroxy radical and $x$ is an integer from 3 to 4, with a dihydric alcohol in the presence of an alkaline earth metal carbonate.

7. The process of claim 6 in which the dihydric alcohol is diethylene glycol and the carbonate is calcium carbonate.

8. The process of claim 7 in which R is nitroxy.

9. The process of claim 7 in which R is chlorine.

References Cited in the file of this patent

UNITED STATES PATENTS

| | | |
|---|---|---|
| 2,429,886 | Loder | Oct. 28, 1947 |
| 2,451,942 | Gresham | Oct. 19, 1948 |
| 2,531,392 | Breslow et al. | Nov. 28, 1950 |
| 2,692,874 | Langerak | Oct. 26, 1954 |
| 2,823,197 | Morris et al. | Feb. 11, 1958 |
| 2,894,934 | Burkhard | July 14, 1959 |